July 9, 1940.  A. A. HOCHER  2,207,009
FASTENING OR ANCHORING MEANS FOR INSULATOR SUPPORTING PINS
Filed July 3, 1937
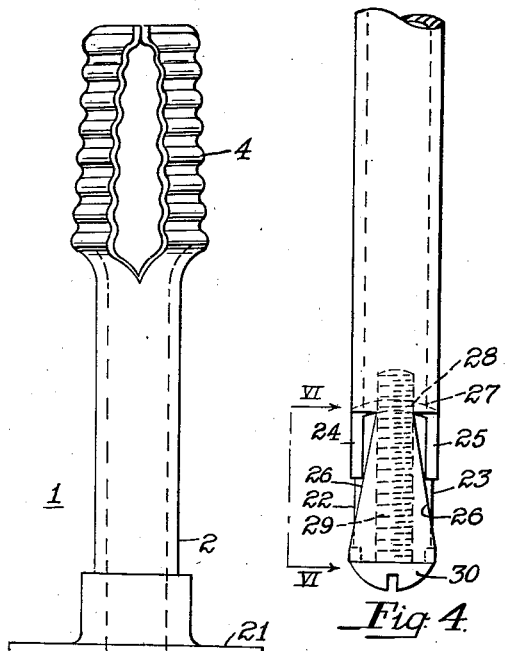
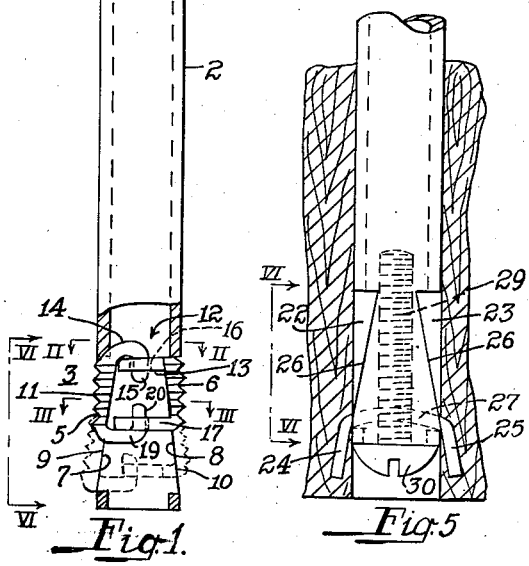
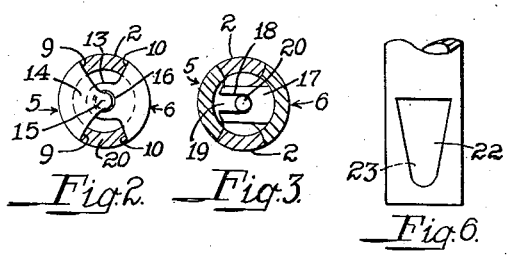
INVENTOR
Andrew A. Hocher
By Green & McCallister
His Attorneys Patented July 9, 1940

2,207,009

UNITED STATES PATENT OFFICE 2,207,009

FASTENING OR ANCHORING MEANS FOR INSULATOR SUPPORTING PINS

Andrew A. Hocher, Etna, Pa., assignor to Hubbard and Company, a corporation of Pennsylvania Application July 3, 1937, Serial No. 151,881

5 Claims. (Cl. 287—20)

This invention relates to support members of the pin type on which insulators are mounted to which, for example, line conductors are secured, and more particularly to means for securing or anchoring such support members to cross arms, wall structures, or other primary supports.

One object of this invention is to provide a new and improved means for securing support pins to primary support structures, for example, poles, walls, cross arms, etc., the support pins being inserted in holes or apertures in the primary support structure and the securing means associated with the pins acting on the walls of the holes or apertures surrounding the portion of the pin disposed therein.

Another object of the invention is to provide a securing means that is particularly applicable to pins having hollow shanks throughout and that are operable by a wedging action into the wall of the hole surrounding the portion of the pin extending into the same.

Another object of the invention is to provide a fastening means that is effective to anchor the pin more and more firmly as the fastening means is correspondingly moved in its position.

Other objects of the invention will, in part, be apparent and will, in part, be understood from the following description taken in conjunction with the accompanying drawing, in which Figure 1 is a view partly in side elevation and partly in section of an insulator support pin provided with a fastening or locking device made in accordance with an embodiment of the invention;

Figs. 2 and 3 are views in section taken on lines II—II and III—III, respectively, of Fig. 1 showing the construction of the locking device and its operative relationship with the shank of the support pin;

Fig. 4 is a partial view in side elevation of the shank of a pin such as that shown in Fig. 1 provided with a locking or anchoring device made in accordance with a modified form of the invention;

Fig. 5 is a view of the pin of Fig. 4 illustrating the action of the locking device when the pin is mounted in a hole of a cross arm, telegraph pole, or other primary support; and Fig. 6 is a view of the lower portion of the shank of the pin of either Fig. 1 or Fig. 4, as seen looking in the direction of arrows VI—VI of Figs. 1, 4 and 5 without the locking or anchoring device.

Throughout the drawing and specification like reference characters designate corresponding parts.

In Fig. 1 of the drawing there is illustrated a support pin 1 having a tubular shank 2 which is provided at one end with a fastening or locking device 3 constructed in accordance with one form or embodiment of the invention, and at the other end with a threaded cage or thimble 4 on which an insulator may be mounted. Device 3 comprises elements or members 5 and 6 disposed on opposite sides of the pin shank 2. Pin shank 2 is provided on its opposite sides with apertures or openings 7 and 8 so shaped and formed that upwardly and inwardly inclined surfaces or edges 9 and 10 are provided, respectively, at the sides of these apertures for supporting members 5 and 6 and also for actuating members 5 and 6 into or out of locking position with respect to the walls of a pin hole formed in a primary support such, for example, as a cross arm, telegraph pole, or the wall of a building.

Members 5 and 6 are somewhat arcuately shaped in transverse section so as to conform to the contour of the pin shank, and are provided with screw threads 11 on their outer surfaces. The upper ends of members 5 and 6 are flexibly or movably connected by a bridge connection 12. Connection 12 is formed by a flange 13 on member 6 that extends through opening 8 into the interior of the pin shank, and a flange 14 on member 5 that projects through opening 7 into the pin shank. Flange 14 overlies flange 13 and is formed with a downwardly extending pin 15 that is received in an opening or aperture 16 in flange 13. Thus the upper ends of members 5 and 6 are in effect connected together by a bridging member having a hinged joint therein.

The lower ends of members 5 and 6 may be held in alignment with each other by means of an inwardly turned flange 17 on member 6 having a slot 18 therein and an inwardly turned flange 19 on member 5 disposed below flange 17 and formed with a pin 20 that projects upwardly into slot 18. Thus the lower ends of members 4 and 5 may move toward or away from each other, but are held in alignment with each other by the pin 20 and slot 18.

When members 5 and 6 are moved downwardly along pin shank 2 they are moved outwardly at an angle to the walls of the pin shank by the wedging action of surfaces 9 and 10.

The operation of locking device 3 is as follows: When the shank of pin 1 is inserted in a hole in a cross arm or telegraph pole or other support until the flange 21 secured to the shank bears on the cross arm or pole, and the pin turned with a wrench or other suitable tool, the screw threads 11 on members 5 and 6 will cut into the walls of the pin hole. As the pin is turned the members 5 and 6 will advance because of the screw threads 11, along the pin shank over surfaces 9 and 10 and be moved radially outward into the walls of the pin hole by the wedging action of surfaces 9 and 10. The more the pin is turned and the more members 5 and 6 are advanced along surfaces 9 and 10 the more firmly is the pin locked or secured in place, because members 5 and 6 are actuated radially outward to a greater extent the more they are advanced along the edges 9 and 10.

By turning the pin in the opposite direction, members 5 and 6 follow the threads formed in the wall of the pin hole and move upwardly along surfaces 9 and 10 out of gripping position, i. e., they are moved to the position shown in full lines in Fig. 1, the anchoring position being indicated by broken lines.

By inspection of Fig. 1, it will be apparent that openings 7 and 8 are cut at such an angle that surfaces 9 and 10 converge upwardly towards the longitudinal axis of the pin shank, that is, the upper portions of these edges are closer to the longitudinal axis of the pin than lower portions thereof; therefore edges 9 and 10 act as wedges in respect to members 5 and 6 causing them to spread or flare outwardly as they are moved downwardly along the pin shank.

Figs. 2 and 3 represent sectional views taken on lines II—II and III—III of Fig. 1 and illustrate the shape and construction of members 5 and 6 and also show how the edges of members 5 and 6 rest on surfaces 9 and 10 of openings 7 and 8.

In Figs. 4, 5 and 6, a modified form of anchoring device is illustrated in connection with a pin shank such as shown in Fig. 1. The pin shank in these figures is provided with openings or apertures 22 and 23 located on diametrically opposite sides and shaped like the openings in the pin shank of Fig. 1. The anchoring device comprises wings or fingers 24 and 25 having a width great enough to bear on the opposite edges 26 of these openings and are connected at their upper ends by means of a bridging member or portion 27. This bridging member has a width substantially that of the minimum opening width as will be understood and is illustrated as being integral with the upper ends of the wings and is provided with a tapped opening 28 to accommodate a screw 29. The head 30 of the screw is shaped to bear on the lower end of the pin shank and when this screw is turned it moves the anchoring or locking device downwardly along the wedging surfaces 26. When the pin is inserted in the pin hole of a cross arm, as shown in Fig. 5, and when the screw is turned in such a direction as to pull the locking device downwardly, wings 24 and 25 will spread outwardly and embed themselves in the walls of the pin hole in the manner indicated in Fig. 5. It will be apparent from inspection that the further the wings are pulled downwardly by the action of the screw, the further these members will be spread outwardly by the wedging surfaces 26 and the more firmly the anchoring device will lock the pin in its pin hole.

Thus it is seen in all of the forms of the invention illustrated, the locking or fastening actions of the fastening devices are accomplished by means of screws and wedging surfaces. In the form shown in Figs. 1, 4 and 6, the wedging action is accomplished by means of wedging surfaces formed in the body of the pin shank and that in the one form the locking members are advanced by means of screw threads formed on the locking members, whereas in the other the locking members are moved into locking position by means of a screw having screw threaded engagement with such locking member.

Having thus described the invention, what I desire to secure by Letters Patent is:

1. In combination, an insulator support pin having a shank formed with wedging surfaces in the wall thereof, and a locking member adapted to be actuated by said surfaces into gripping position with the walls of a pin hole when the shank is within the same, said locking member having screw threads thereon which when the pin shank is turned advance along the pin hole and the wedging surfaces causing the locking member to grip the pin hole walls.

2. In combination, an insulator support pin having a shank formed with wedging surfaces in the wall thereof, a locking member adapted to be actuated by said surfaces into gripping position with the walls of a pin hole when the shank is within the same, and a screw-threaded member having threaded engagement with said locking member for advancing the locking member over said wedging surfaces and into gripping engagement with the walls of the pin hole.

3. In combination, an insulator support pin having a tubular shank provided with opposed tapered slots therein, expansible fastening members adapted to ride on the sides of said slots and connected interiorly of said shank, and means for effecting relative movement of said fastening members along said slot sides to contract and expand the said fastening members for locking and unlocking purposes.

4. In combination, an insulator support pin having a hollow shank provided with diametrically opposed apertures in the wall thereof, said apertures being formed at an angle to the axis of the shank so as to provide diverging surfaces, and locking members positioned in said apertures and bearing on said diverging surfaces, said members being flexibly connected at their upper ends at a point within the pin shank and having screw threads on their outer surfaces whereby when the pin is inserted in a pin hole and the pin turned therein, the screw threads will advance along the pin hole and move said members along said bearing surfaces whereby said members are spread outwardly into gripping relation with the walls of the pin hole.

5. In combination, an insulator support pin having a hollow shank provided with oppositely positioned apertures in the walls thereof, said apertures being formed at an angle to the axis of the shank so as to provide downwardly diverging surfaces, locking members positioned in said apertures and bearing on said diverging surfaces, a bridge member connecting said members, and a screw having threaded engagement with the bridge member for advancing the same axially thereof and moving said locking members along said diverging surfaces into gripping position with the wall of a pin hole when the shank is inserted therein.

ANDREW A. HOCHER.